June 10, 1947. W. H. J. BROCK 2,421,869
AUTOMATICALLY ADJUSTABLE FORCE TRANSMITTING LINKS
Filed Feb. 15, 1945 2 Sheets-Sheet 1
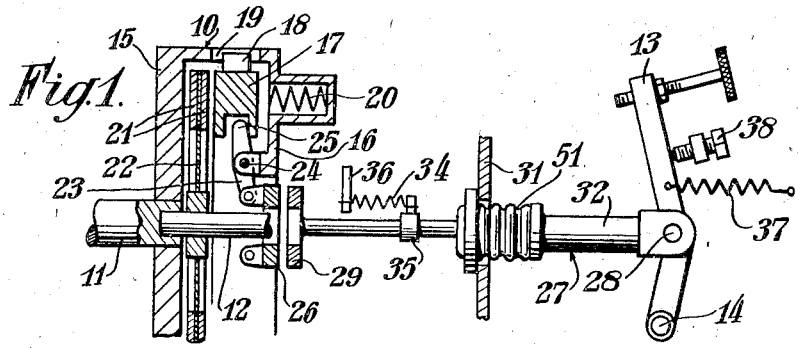
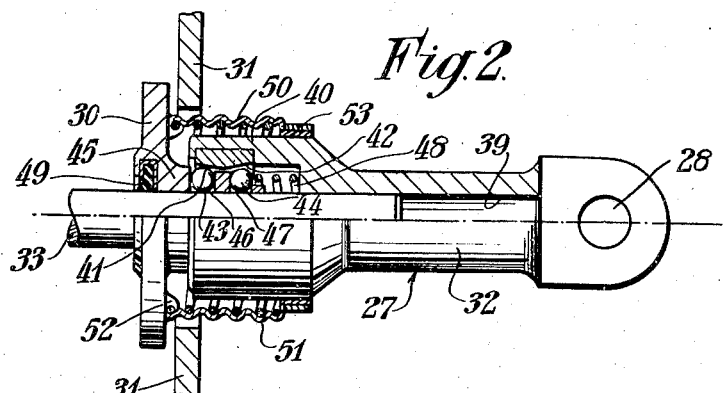
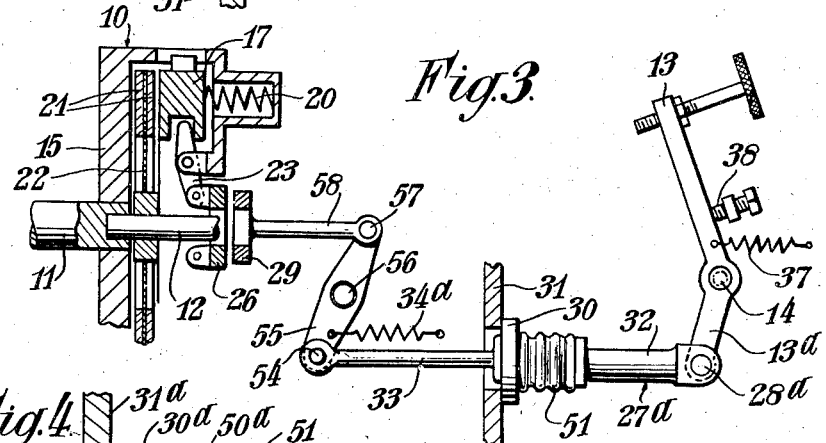
Inventor
William Hudson James Brock
by Stevens and Davis
his attorneys

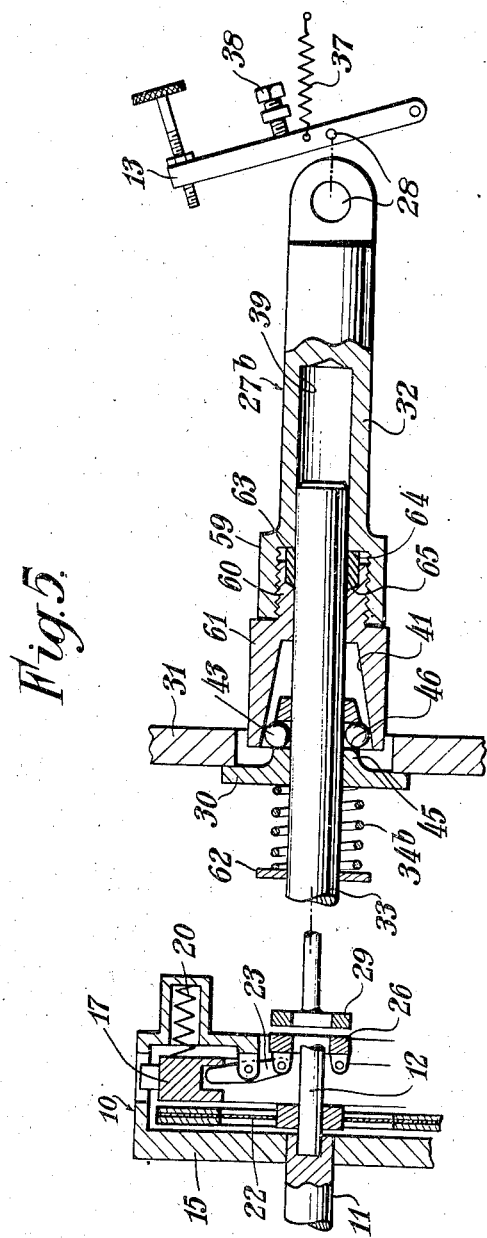

Patented June 10, 1947

2,421,869

UNITED STATES PATENT OFFICE 2,421,869

AUTOMATICALLY ADJUSTABLE FORCE TRANSMITTING LINK

William Hudson James Brock, Leamington Spa, England, assignor to Automotive Products Company Limited, Leamington Spa, England Application February 15, 1945, Serial No. 577,958
In Great Britain February 18, 1944

10 Claims. (Cl. 192—111)

This invention relates to automatically adjustable force transmission links such as are used for transmitting the force applied to a pedal, hand lever or the like to the mechanism to be operated thereby.

It is the object of the invention to provide a simple and efficient form of automatic adjusting mechanism, which is intended more particularly for use in the disengaging means of vehicle and like torque transmitting clutches and in brakes. It is well known that with such clutches, the frictional elements of which are normally held in engagement by springs, wear of the frictional elements has the effect of progressively diminishing the scope of movement of the releasing mechanism, and it is therefore an object of the invention to provide a clutch releasing mechanism which acts automatically to maintain a predetermined operating movement, thus at all times ensuring that the releasing mechanism can completely release the clutch. Another object of the invention is to provide an improved mechanism in which a predetermined clearance between the rotating and non-rotating parts is automatically obtained when the mechanism is inoperative, the mechanism being self-adjusting each time the clutch is released or the brake is applied.

According to the invention an automatically adjusting force-transmitting link device comprises in combination first and second telescopically slidable members, means for moving the first telescopic member, a friction clutch device resiliently urged to connect said telescopic members in force-transmitting relationship, a releasing member for said friction clutch device, said releasing member moving with the telescopic members when they are operatively connected by the friction clutch device, and a fixed abutment which is engaged by the releasing member at a predetermined point in the return movement of the link, whereby further return movement releases the friction clutch device. Conveniently a stop is provided to arrest movement of the first telescopic member after the said friction clutch device is released.

As a further aspect of the invention an automatically adjusting force-transmitting link device comprises in combination first and second telescopically slidable members, means for moving the first telescopic member, a main friction clutch device resiliently urged to connect said telescopic members in force-transmitting relationship, a releasing member for said main friction clutch device, said releasing member moving with the telescopic members when they are operatively connected by the friction clutch device, a fixed abutment which is engaged by the releasing member at a predetermined point in the return movement of the link whereby continued return movement releases the main friction clutch device, and auxiliary frictional means which are brought into action by still further return movement of the first telescopic member, thus re-connecting said telescopic members before they reach their fully returned position. Preferably the main friction clutch device comprises a circumferential row of balls arranged between a tapering surface on the first telescopic member and a substantially cylindrical surface on the second telescopic member; the auxiliary clutch device can also be arranged similarly. The releasing member can conveniently comprise a tubular cage for the balls of both the main and auxiliary clutch devices, the balls of the auxiliary clutch device being arranged to fit within slots in the cage so as to allow substantial axial movement of the cage relative to said balls. A spring urges the balls of the auxiliary clutch device each towards one end of its slot.

In an alternative arrangement the auxiliary clutch device is continuously operative to resist relative axial movement of the telescopic members, said auxiliary clutch device conveniently comprising a ring fitted within the outer of the telescopic members and arranged to press inwards upon the inner of said members.

If desired the second telescopic member may comprise a rod fitting slidably within a tubular portion of the first telescopic member. A coiled compression spring, acting between one of the telescopic members and the releasing member, may serve as a support for a flexible boot protecting the clutch device or devices against the entrance of foreign matter.

The invention is illustrated in the accompanying diagrammatic drawings, in which:

Figure 1 is a fragmentary side elevation of a clutch and its releasing mechanism, which latter incorporates an automatically adjusting link of the compression type;

Figure 2 is a sectional elevation of the link drawn to an enlarged scale, the parts being shown in their operative or clutch-disengaged position;

Figure 3 is a view similar to Figure 1 showing a releasing mechanism having an automatically adjusting link which operates in tension;

Figure 4 is a fragmentary sectional elevation of the working parts of the link, drawn to an enlarged scale; and Figure 5 is a sectional elevation of another modified form of releasing mechanism.

In Figure 1 a friction clutch, indicated generally at 10, normally forms a driving connection between, say, an engine shaft 11 and a coaxial output shaft 12, the connection being broken, when required, by moving a clutch pedal lever 13 in an anti-clockwise direction about its fulcrum 14. The clutch 10 comprises a disc 15, conveniently the engine flywheel, which carries a casing 16 containing an annular pressure plate 17. The pressure plate 17 is rotatable with the disc 15 and cover 16 owing to the provision of lugs, one of which is seen at 18, each lug being slidable in an axial direction within a slot 19 in the cover 16. A number of coiled compression springs, one of which is seen at 20, are accommodated within the cover 16 and act upon the pressure plate 17 so as to force the latter to the left, thus gripping, between said pressure plate 17 and the disc 15, the annular facings 21 of a driven clutch disc 22 carried by the output shaft 12. Releasing mechanism, arranged to move the pressure plate 17 towards the right against the action of the springs 20, comprise a number of radial levers, one of which is shown at 23. It is pivoted to the cover 16 at 24 and has its outer end 25 in engagement with a recess formed in the pressure plate 17, while its inner end is connected (say by a pin and slot connection) with a release ring 26 surrounding the output shaft 12. Therefore movement of the release ring 26 to the left causes the pressure plate 17 to be moved to the right, so enabling the disc 15 and pressure plate 17 to rotate independently of the clutch disc 22.

The release ring 26 is, of course, actuated by the pedal lever 13, and for this purpose a compression link device is provided and is indicated generally at 27, said link device being connected pivotally with the lever 13 at 28, while at its opposite end it is provided with a fork member 29 adapted to be brought into engagement with the release ring 26; the link 27 also has a flange member 30, which is adapted to cooperate with an abutment plate 31, which latter is fixed in relation to the fulcrum 14. The link 27 comprises two members which fit telescopically, as will be hereinafter explained, the first member being indicated at 32, while the second member is shown at 33 and is urged towards the left by a coiled tension spring 34; this spring extends between a collar 35 on the second member 33 and an anchorage 36. The pedal lever 13 is urged in a clockwise direction by a return spring 37, such movement being limited by an adjustable stop 38. It will be seen that when pressure is applied to the pedal lever 13 the link 27 is moved bodily to the left, and the fork 29 bears against the rotating release ring 26, thus causing the levers 23 to be deflected and shift the pressure plate 17 away from the driven disc 22. During the life of the clutch 10 wear of the facing members 21 occurs, with the result that the position of the pressure plate 17 during normal engagement progressively moves to the left, so that the release ring 26 correspondingly moves in the direction towards the fork member 29; this, of course, progressively reduces the amount of operating movement for any given setting of the stop 38 and may eventually prevent the clutch from engaging fully. In order to avoid the necessity of frequently adjusting the operating mechanism the improved link 27 is arranged to adjust its length automatically, and the means whereby this effect is secured is shown in Figure 2. The second member 33 is in the form of a rod which fits slidably within a bore 39 in the first member 32. The left-hand end of the first telescopic member 32 is enlarged in diameter and is provided internally with an auxiliary fixed ring 40 having a pair of frusto-conical surfaces 41 and 42. These are engaged by two circumferential rows of balls, namely a row 43 which engages with the frusto-conical surface 41 to form a main clutch device, and a second row 44 which engages with the frusto-conical surface 42 to act as an auxiliary clutch device, both rows of balls, of course, being adapted to engage frictionally with the external cylindrical surface of the telescopic member 33. The action of the balls 43, 44 is controlled by a releasing member 45, which is of tubular form and is freely slidable upon the second telescopic member 33. The releasing member 45 is formed with a circumferential series of holes 46, within which the balls 43 engage sufficiently snugly to prevent substantial movement in an axial direction relative to the releasing member 45. On the other hand the balls 44 are accommodated within larger holes or slots 47 adapted to allow the balls to move axially for a short distance relative to the releasing member 45, said balls being urged to the left by a light coiled compression spring 48. The releasing member 45 is formed at its outer end with the flange 30 for engagement with the abutment stop 31, and it is also fitted with an annular seal 49 to prevent the ingress of dirt and other foreign matter to the working parts. The flange 30 is urged resiliently towards the first telescopic member 32 by a coiled tension spring 50, which is conveniently incorporated in a concertina boot 51, also for preventing the entrance of foreign matter, one end of the combined boot and spring 50, 51 being attached to projections 52 upon the flange 30, while the other end is secured to the first telescopic member 32 by a clamping band 53. Thus the spring 50 acts to urge the releasing member 45 towards the right and so maintains the main clutch device 41, 43 in action, i. e., so long as the flange 30 is free from the abutment member 31.

The operation of the automatically adjusting link 27 is as follows. When the clutch 10 is in a disengaged condition owing to the application of force to the pedal lever 13, the link 27 is transmitting thrust and the parts are in the positions shown in Figure 2. When the pedal lever 13 is released the link 27 is at first moved to the right owing to the force exerted by the clutch springs 20, said springs, of course, having a much more powerful effect than the relatively light tension spring 34. When the pedal lever 13 reaches a predetermined position adjacent the stop 38, the flange 30 of the releasing member 45 comes into engagement with the fixed abutment 31, so that the next increment of movement of the lever 13 merely carries the first telescopic member 32 slightly to the right, thus releasing the radial pressure on the balls 43 and freeing the second telescopic member 33. If, at this stage of the operation, the clutch 10 is not completely engaged (say owing to wear having taken place) the springs 20 will be able to complete the engagement, the release ring 26 pressing the second member 33 to the right so that it slides further into the first telescopic member 32. It is undesirable for the fork member 29 to remain in contact with the rotating release ring 26, and therefore the final movement of the pedal lever 13 is arranged to produce a clearance between these parts; this is achieved by the auxiliary clutch 42, 44, which comes into action just before the pedal lever 13 reaches its stop 38, the balls 44 frictionally re-connecting the first telescopic member 32 with the second member 33. The final movement of the pedal lever 13 therefore shifts the fork member 29 away from the release ring 26 and provides a predetermined running clearance, depending upon the adjustment of the stop 38. The enlarged holes or slots 47 enable the balls 44 to move with the telescopic member 32 and relative to the releasing member 45. When the pedal lever 13 is next operated to disengage the clutch 10 the initial movement brings the balls 44 back to the left-hand ends of their slots, and the auxiliary clutch 42, 44 then becomes disengaged; the second member 33 is then free to move axially and it is therefore urged by the spring 34, so that the fork member 29 is pressed lightly against the release ring 26. As the movement of the lever 13 continues, the main clutch device 41, 43 comes into action and is capable of transmitting the clutch-disengaging force from the pedal lever 13 to the pressure plate 17, the flange 30 of the releasing member 45, of course, leaving the abutment member 31.

It will be seen that at the stage when the main clutch device 41, 42 and the auxiliary clutch device 42, 44 are both disengaged the second telescopic member 33 is freely slidable in either direction, and the spring 34 therefore positions the fork member 29 in engagement with the ring 26, irrespective of the position to which said ring may have shifted since the preceding actuation of the mechanism. The device thus compensates for variations in either direction. It is therefore equally applicable to components, such as internal shoe drum brakes, where wear of the parts has the tendency to increase the pedal movement required for a full application.

The arrangement shown in Figures 3 and 4 is similar in general construction, but the improved link, indicated at 27a, is adapted to operate in tension when transmitting the clutch dis-engaging force, thus making it suitable for a different layout of releasing mechanism. The pedal lever 13 again has its fulcrum at 14 and is provided with a return spring 37 and an adjustable stop 38. It is provided with a depending arm 13a connected to the link 27a at 28a. The second member 33 of the link 27a is pivoted at 54 to a lever 55; the latter has its fulcrum at 56 and is pivotally connected at its other end 57 with a rod 58 carrying the fork member 29. The fork member 29 is urged towards the release ring 26 by a coiled tension spring 34a acting upon the lever 55. The internal arrangement and operation of the clutch 10 is the same as that previously described.

In this adaptation of the invention the first telescopic member 32 is the same as before, except that the frusto-conical surfaces 41 and 42 are reversed. The second telescopic member 33 is again in the form of a rod freely slidable within the bore 39, but the releasing member, indicated at 45a, is a somewhat different arrangement. It is slidable on the member 33 and is formed at its right-hand end with a circumferential series of holes 46 accommodating snugly the balls 43 of the main clutch device. The auxiliary clutch device is constituted by a row of balls 44, which are disposed within slots 47 in the releasing member 45a and are urged normally towards the right-hand ends of those slots by a coiled compression spring 48a acting upon a slidable washer 48b. The other end of said spring abuts against the seal 49. The releasing member 45a also has a flange, indicated at 30a for engagement with a fixed abutment 31a. A boot 51 extends between this flange 30a and the first telescopic member 32, said boot containing a coiled spring, which in this instance is of the compression type, so as to urge the flange 30a away from the first telescopic member 32.

The operation of the device will be clear from the foregoing description, and it is briefly as follows. The parts shown in Figure 4 are in the positions which they occupy when the clutch 10 is disengaged, and it will be seen that the pull exerted upon the first telescopic member 32 by the pedal lever 13 is transmitted through the main clutch device 41, 43 to the second telescopic member 33 and thence in thrust through the rod 58 to the fork member 29. As the pedal lever 13 is released, the clutch springs 20 cause the link 27a to be pulled towards the left until the flange 30a engages the abutment 31a. Movement of the first telescopic member 32 towards the left then continues under the action of the pedal return spring 37, so as to release the main clutch device 41, 43 and free the second telescopic member 33; as a result the springs 20 are quite free to force the clutch 10 into full engagement (if it is not already so) and the spring 34a urges the fork member 29 into light engagement with the release ring 26. As the pedal lever 13 approaches its stop 38 the auxiliary clutch 42, 44 comes into action, so that the final movement of the pedal lever 13 shifts the second member 33 to the left and provides a predetermined running clearance between the fork member 29 and the release ring 26. Owing to the fact that the main and auxiliary clutch devices are simultaneously in a disengaged position whenever the pedal lever 13 reaches a predetermined point in its travel, the clutch 10 automatically adjusts the position of the second telescopic member 33 during each disengagement and engagement of the clutch and thus efficiently compensates for any wear that may take place in the working parts of the clutch 10.

A somewhat simplified construction of link is shown in Figure 5, for use where automatic compensation is only required in one direction; the clutch pedal lever 13 and the clutch 10 are drawn diagrammatically to a reduced scale. The link is indicated at 27b and is arranged to transmit the clutch-disengaging force in compression, so that in its main respects it resembles the device shown in Figures 1 and 2. The first telescopic member 32 is again tubular and is pivoted to the pedal lever 13 at 28. The opposite end of the first telescopic member 32 is formed with an internally screw-threaded socket 59 receiving the spigot 60 of a cup-shaped member 61, which latter is formed internally with the frusto-conical surface 41 of the main clutch device. The latter comprises a circumferential row of balls 43 fitting snugly within holes 46 formed in a tubular releasing member 45. This, as before, is freely slidable upon the second telescopic member 33 which is also slidable within the coaxial bore 39 of the first telescopic member 32. A light coiled compression spring 34b acts between a flange 62 on the second telescopic member 33 and the releasing member 45, thus serving to hold the main clutch device 41, 43 in engagement and at the same time urging the fork member 29 towards the release ring 26. As before, the releasing member 45 is formed with a flange 30, which is adapted to engage with a fixed abutment 31 so as to release the main clutch device 41, 43 as the pedal lever 13 reaches a predetermined position in relation to the fixed abutment 31.

The auxiliary clutch is constituted by a ring 63 of fibrous or other packing material which is disposed within the socket 59 and is clamped axially between the shoulder 64 thereof and a frusto-conical surface 65 upon the end part of the spigot 60, thus causing the ring 63 to press inwards upon the outer cylindrical surface of the second telescopic member 33.

The action of the device shown in Figure 5 is as follows. The parts are in the positions which they occupy when the clutch 10 is completely engaged, the pedal lever 13 resting against the adjustable stop 38, and a running clearance being present between the fork member 29 and the release ring 26; at the same time the flange 30 is in engagement with the abutment member 31. As the pedal lever 13 is moved to the left to release the clutch 10, the friction of the ring 63 forming the auxiliary clutch device causes the second telescopic member 33 to be moved by the first telescopic member 32 until the fork member 29 presses against the release ring 26. If by this time the first telescopic member 32 has moved sufficiently far to the left to engage the main clutch device 41, 43, this device transmits the pedal force to the release ring 26 and disengages the clutch 10. If necessary, however, the first telescopic member 32 can slide upon the second telescopic member 33 until the main clutch device 41, 43 comes into action, since the frictional drag of the ring 63 is much weaker than the resistance to movement of the second telescopic member 33 on account of the force exerted by the clutch springs 20; the ring 63 is, however, capable of transmitting frictionally a greater force than is exerted on the second telescopic member 33 by the spring 34b. During this engagement of the clutch 10 the flange 30 moves away from the abutment 31. When the pressure on the pedal lever 13 is released the clutch springs 20 push the second telescopic member 33 to the right until the flange 30 re-engages with the abutment member 31, which should take place just as the clutch 10 becomes fully engaged. Continued movement of the pedal lever 13 to the right owing to the action of the spring 37 causes the clutch device 41, 43 to be disengaged and consequently frees the second telescopic member 33 except for the light force exerted thereon by the ring 63. If, therefore, the clutch 10 is not completely re-engaged, the springs 20 can push the second telescopic member 33 further into the first telescopic member 32 until the engagement is complete. The pedal lever 13 still has a slight distance to travel before it reaches the stop 38, and owing to the friction of the ring 63 it pulls back the second telescopic member 33 by a corresponding amount, thus producing the requisite running clearance between the fork member 29 and the release ring 26.

It will be understood that the arrangements which have been described are given merely by way of example and that various modifications may be made to suit requirements. Thus in some cases, especially where a normal running clearance is not required between the parts 26 and 29 or their equivalents, the auxiliary clutch device may be omitted. Moreover in all cases for the main and/or auxiliary clutch device any mechanism may be used which has in effect a continuously variable ratchet action. Also various other devices are suitable, more especially for use in the capacity of an auxiliary clutch device, one example being a frictional band which is carried by one of the telescopic members and engages with the other, said band being automatically tightened by a relative movement between the first telescopic member and a fixed abutment, a cam device conveniently being used for the purpose. As above mentioned, the link device according to the invention may be used in mechanism other than clutch-operating mechanism, such, for instance, as in connection with brakes, especially where the wear of the frictional surfaces tends to reduce the stroke of the releasing mechanism.

What I claim is:

1. An automatically adjusting force-transmitting link device, comprising in combination first and second telescopically slidable members, means for moving the first telescopic member, a main friction clutch device resiliently urged to connect said telescopic members in force-transmitting relationship, a releasing member for said main friction clutch device, said releasing member moving with the telescopic members when they are operatively connected by the friction clutch device, a fixed abutment which is engaged by the releasing member at a predetermined point in the return movement of the link device whereby continued return movement releases the main friction clutch device, and auxiliary frictional means which are brought into action, by still further return movement of the first telescopic member, thus reconnecting said telescopic members before they reach their fully returned position.

2. An automatically adjusting force-transmitting link device as claimed in claim 1, wherein the main friction clutch device comprises a circumferential row of balls arranged between a tapering surface on the first telescopic member and a substantially cylindrical surface on the second telescopic member.

3. An automatically adjusting force-transmitting link device as claimed in claim 1, wherein the auxiliary clutch device comprises a circumferential row of balls arranged between a tapering surface on the first telescopic member and a substantially cylindrical surface on the second telescopic member.

4. An automatically adjusting force-transmitting link device as claimed in claim 1, wherein the main and auxiliary clutch devices each comprises a circumferential row of balls arranged between a tapering surface on the first telescopic member and a substantially cylindrical surface on the second telescopic member and the releasing member comprises a tubular cage for the balls of both the main and auxiliary clutch devices.

5. An automatically adjusting force-transmitting link device as claimed in claim 1, wherein the main and auxiliary clutch devices each comprises a circumferential row of balls arranged between a tapering surface on the first telescopic member and a substantially cylindrical surface on the second telescopic member and the releasing member comprises a tubular cage for the balls of both the main and auxiliary clutch devices, the balls of the auxiliary clutch device fitting within slots in the cage so as to allow substantial axial movement of the cage relative to said balls.

6. An automatically adjusting force-transmitting link device as claimed in claim 1, wherein the main and auxiliary clutch devices each comprises a circumferential row of balls arranged between a tapering surface on the first telescopic member and a substantially cylindrical surface on the second telescopic member and the releasing member comprises a tubular cage for the balls of both the main and auxiliary clutch devices, the balls of the auxiliary clutch device fitting within slots in the cage so as to allow substantial axial movement of the cage relative to said balls, and a spring urging the balls of the auxiliary clutch device each towards one end of its slots.

7. An automatically adjusting force-transmitting link device, comprising in combination first and second telescopically slidable members, means for moving the first telescopic member, a main friction clutch device resiliently urged to connect said telescopic members in force-transmitting relationship, a releasing member for said main friction clutch device, said releasing member moving with the telescopic members when they are operatively connected by the friction clutch device, a fixed abutment which is engaged by the releasing member at a predetermined point in the return movement of the link device whereby continued return movement releases the main friction clutch device, and auxiliary frictional means connecting said telescopic members when the main friction clutch device is in the released position and thereby causing the second telescopic member to move with the first telescopic member during the final return movement of the latter.

8. An automatically adjusting force-transmitting link device, comprising in combination first and second telescopically slidable members, means for moving the first telescopic member, a main friction clutch device resiliently urged to connect said telescopic members in force-transmitting relationship, a releasing member for said main friction clutch device, said releasing member moving with the telescopic members when they are operatively connected by the friction clutch device, a fixed abutment which is engaged by the releasing member at a predetermined point in the return movement of the link device whereby continued return movement releases the main friction clutch device, and auxiliary frictional means which are continuously operative to resist relative axial movement of the telescopic members.

9. An automatically adjusting force-transmitting link device, comprising in combination first and second telescopically slidable members, means for moving the first telescopic member, a main friction clutch device resiliently urged to connect said telescopic members in force-transmitting relationship, a releasing member for said main friction clutch device, said releasing member moving with the telescopic members when they are operatively connected by the friction clutch device, a fixed abutment which is engaged by the releasing member at a predetermined point in the return movement of the link device whereby continued return movement releases the main friction clutch device, and auxiliary frictional means which are continuously operative to resist relative axial movement of the telescopic members, said auxiliary fractional means comprising a ring fitted within the outer of the telescopic members and arranged to press inwards upon the inner of said members.

10. An automatically adjusting force-transmitting link device comprising in combination first and second telescopically slidable members, means for moving the first telescopic member, a friction clutch device resiliently urged to connect said telescopic members in force-transmitting relationship, a releasing member for said friction clutch device, said releasing member moving with the telescopic members when they are operatively connected by the friction clutch device, a fixed abutment which is engaged by the releasing member at a predetermined point in the return movement of the link device, whereby further return movement releases the friction clutch device, and a coiled spring, acting between one of the telescopic members and the releasing member, said spring serving as a support for a flexible boot protecting the clutch device against the entrance of foreign matter.

WILLIAM HUDSON JAMES BROCK.

REFERENCES CITED

The following references are of record in the file of this patent:

UNITED STATES PATENTS

| Number | Name | Date |
| --- | --- | --- |
| 2,002,841 | Tatter | May 28, 1935 |
| 2,061,093 | Tatter | Nov. 17, 1936 |

FOREIGN PATENTS

| Number | Country | Date |
| --- | --- | --- |
| 297,339 | Great Britain | Sept. 17, 1928 |
| 631,969 | France | Sept. 24, 1927 |
| 704,960 | Germany | Apr. 12, 1941 |